United States Patent
Rosén et al.

(10) Patent No.: US 11,644,199 B2
(45) Date of Patent: May 9, 2023

(54) CONTROLLING POWER CONSUMPTION IN A THERMAL ENERGY SYSTEM

(71) Applicant: E.ON SVERIGE AB, Malmo (SE)

(72) Inventors: Per Rosén, Lund (SE); Jacob Skogström, Lomma (SE); Helen Carlström, Bjärred (SE); Bengt Lindoff, Bjärred (SE)

(73) Assignee: E.ON SVERIGE AB, Malmo (SE)

( * ) Notice: Subject to any disclaimer, the term of this patent is extended or adjusted under 35 U.S.C. 154(b) by 134 days.

(21) Appl. No.: 17/304,887

(22) Filed: Jun. 28, 2021

(65) Prior Publication Data

US 2022/0003429 A1 Jan. 6, 2022

(30) Foreign Application Priority Data

Jul. 2, 2020 (EP) .................................... 20183771

(51) Int. Cl.
*F24D 19/10* (2006.01)
*F24D 3/18* (2006.01)

(52) U.S. Cl.
CPC ........... *F24D 19/1048* (2013.01); *F24D 3/18* (2013.01); *F24D 19/1039* (2013.01); *F24D 2200/12* (2013.01)

(58) Field of Classification Search
CPC .... F24D 19/1048; F24D 3/18; F24D 19/1039; F24D 2200/12; F24D 11/0207; F24D 10/00; F24D 2200/123; F24D 2200/13; F24F 2140/60; F24F 2221/54; F24F 11/61; F24F 11/62; F24F 11/83; F24F 11/46; F24F 3/00; F24F 11/54; F24F 11/63; F24F 11/64; F24F 11/70; F24F 11/89; F24F 2140/20; Y02B 30/12; Y02B 30/17; Y02E 20/14
See application file for complete search history.

(56) References Cited

U.S. PATENT DOCUMENTS

| | | | |
|---|---|---|---|
| 9,671,120 B2* | 6/2017 | Kashima | F24F 11/64 |
| 2005/0278069 A1* | 12/2005 | Bash | F24F 11/62 |
| | | | 454/239 |
| 2012/0029707 A1* | 2/2012 | Dazai | F24D 3/18 |
| | | | 700/282 |
| 2013/0284818 A1 | 10/2013 | Hayashida et al. | |
| 2020/0049381 A1 | 2/2020 | Thielmann | |

FOREIGN PATENT DOCUMENTS

| | | |
|---|---|---|
| EP | 2469238 | 6/2012 |
| EP | 3018422 | 5/2016 |
| EP | 3591298 | 1/2020 |

* cited by examiner

*Primary Examiner* — Marc E Norman
*Assistant Examiner* — Matthew John Moscola
(74) *Attorney, Agent, or Firm* — Knobbe, Martens, Olson & Bear, LLP

(57) ABSTRACT

A central controller for controlling power consumption in a thermal energy system is disclosed, the energy system may include a plurality of heat pump assemblies and a plurality of cooling machine assemblies, each heat pump assembly being connected to a thermal energy circuit comprising a hot conduit and a cold conduit via a thermal heating circuit inlet connected to the hot conduit and via a thermal heating circuit outlet connected to the cold conduit, each cooling machine assembly being connected to the thermal energy circuit via a thermal cooling circuit inlet connected to the cold conduit and via a thermal cooling circuit outlet connected to the hot conduit.

10 Claims, 5 Drawing Sheets

CONTROLLING POWER CONSUMPTION IN A THERMAL ENERGY SYSTEM

FIELD OF THE INVENTION

The present invention relates to thermal energy systems for providing heating and cooling to buildings. More specifically, the present invention relates to a central controller for a thermal energy system, to a thermal energy system comprising such a central controller and to a method for controlling a thermal energy system.

BACKGROUND ART

Today, it is common practice in many parts of the world to provide heating and hot water for houses and buildings via an energy grid. One example of such energy grid is a district heating grid comprising a system of conduits and valves for distributing hot water to the houses and buildings such that the houses can be heated when needed via thermal devices, i.e. heat exchangers, connected to the district heating grid. The hot water may further be used for preparing hot tap water.

To cool the houses and buildings, similar systems may be used. The general principle of these systems is however the opposite. Instead of providing heat by e.g. providing hot water, heat is collected in the houses and transported away from the houses. District cooling grids, that is, networks of conduits and valves connecting several real estates for cooling purposes, using water as heat carrier are however still rare. The common practice is instead to use electrical energy for running air conditioning systems, which is a disadvantage at least from an environmental perspective.

The energy grid may further be formed as a combined heating and cooling grid, which allows provision of both heating and cooling from a single system by using thermal devices connected thereto.

When thermal devices are added to energy grids, especially such combined heating and cooling grids mentioned above, the complexity thereof increases significantly. Especially when considering how to achieve improved efficiency of the thermal energy system and the thereto connected thermal devices. Manufacturers of such systems continuously strive to provide systems with improved efficiency.

SUMMARY OF THE INVENTION

In view of that stated above, the object of the present invention is to provide controlling of a thermal energy system that alleviates some of the problems with prior art systems that are outlined above.

More specifically, there is according to a first aspect provided a central controller for controlling power consumption, particularly electric power consumption, in a thermal energy system. The thermal energy system comprising a plurality of heat pump assemblies, each heat pump assembly being connected to a thermal energy circuit comprising a hot conduit and a cold conduit via a thermal heating circuit inlet connected to the hot conduit and via a thermal heating circuit outlet connected to the cold conduit. A thermal heating circuit flow controller is provided being configured to control a flow of thermal fluid from the thermal heating circuit inlet to the thermal heating circuit outlet. The thermal energy system further comprises a plurality of cooling machine assemblies. Each cooling machine assembly being connected to the thermal energy circuit via a thermal cooling circuit inlet connected to the cold conduit and via a thermal cooling circuit outlet connected to the hot conduit. The thermal energy system comprises a thermal cooling circuit flow controller configured to control a flow of thermal fluid from the thermal cooling circuit inlet to the thermal cooling circuit outlet. The central controller comprises a transceiver configured to: receive power consumption data pertaining to the plurality of heat pump assemblies and the plurality of cooling assemblies; transmit a heating circuit control signal to the thermal heating circuit flow controllers, the heating circuit control signal being indicative of a heating circuit outlet temperature in each thermal heating circuit outlet; transmit a cooling circuit control signal to the thermal cooling circuit flow controllers, the control signal being indicative of a cooling circuit outlet temperature in each thermal cooling circuit outlet. The central controller comprising circuitry configured to execute: an outlet temperature setting function configured to periodically alter the heating circuit outlet temperature and the cooling circuit outlet temperature; and an analyzing function configured to, based on the power consumption data, determine a present total power consumption of the plurality of heat pump assemblies and the plurality of cooling machine assemblies. The outlet temperature setting function being further configured to increase or decrease the heating circuit outlet temperature and the cooling circuit outlet temperature based on a change between a previously determined total power consumption and the determined present total power consumption. The thermal fluid outlet temperature in the heating circuit outlet and in the cooling circuit outlet which provides improved operating conditions, i.e. reduced total electric power consumption, for the entire thermal energy system can thus be found. By the realization in the present disclosure that the respective outlet temperatures are to be controlled, by means of controlling the respective flow of thermal fluid, can the central controller achieve control of the thermal energy system for reducing the total electric power consumption thereof.

The outlet temperature setting function may be configured to set the heating circuit outlet temperature and the cooling circuit outlet temperature to a fixed value for a predetermined period of time. The central controller thus may await a new system balance before analyzing the new present total electric power consumption. Thermal energy systems as defined herein are complex and usually have some system inertia, which preferably should be taken into account before a change in outlet temperature can be reliably evaluated.

The heating circuit outlet temperature may be configured to be set to between −8° C. and 50° C. The cooling circuit outlet temperature may be configured to be set to between −4° C. and 60° C.

In a second aspect a thermal energy system is provided. The thermal energy system comprising:
  a thermal energy circuit comprising a hot conduit configured to allow thermal fluid of a first temperature to flow therethrough, and a cold conduit configured to allow thermal fluid of a second temperature to flow therethrough, the second temperature is lower than the first temperature,
  a plurality of heat pump assemblies, each being connected to a:
  a thermal heating circuit comprising a thermal heating circuit inlet connected to the hot conduit and a thermal heating circuit outlet connected to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet.

each heat pump assembly comprises:
a heat pump; and
a heat pump circuit comprising a heat pump circuit inlet connected to the thermal heating circuit at a first heat pump connection point, a heat pump circuit outlet connected to the thermal heating circuit at a second heat pump connection point and a heat pump control pump configured to control a flow of thermal fluid from the heat pump circuit inlet through the heat pump at a heat extraction side thereof to the heat pump circuit outlet.

The heat pump circuit and the thermal heating circuit partially overlap, the overlap is between the first and second heat pump connection points.

The thermal energy system further comprises a plurality of cooling machine assemblies, each being connected to:
a thermal cooling circuit comprising a thermal cooling circuit inlet connected to the cold conduit and a thermal cooling circuit outlet connected to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet.

Each cooling machine assembly comprising:
a cooling machine; and
a cooling machine circuit comprising a cooling machine circuit inlet connected to the thermal cooling circuit at a first cooling machine connection point, a cooling machine circuit outlet connected to the thermal cooling circuit at a second cooling machine connection point and a cooling machine control pump configured to control a flow of thermal fluid from the cooling machine circuit inlet through the cooling machine at an heat generation side thereof to the cooling machine circuit outlet.

The cooling machine circuit and the thermal cooling circuit partially overlap, the overlap is between the first and second cooling machine connection points.

The thermal energy system further comprises a central controller according to the first aspect configured to control the thermal energy system.

A thermal energy system that can be controlled to achieve a reduced total electric power consumption is thus provided, where the flow of thermal fluid in the thermal heating circuit and in the thermal cooling circuit is controlled such that desired respective outlet temperatures are achieved which provides said reduction in total electric power consumption.

According to a third aspect a method for controlling the power consumption of a thermal energy system is provided. The thermal energy system comprising a hot conduit configured to allow thermal fluid of a first temperature to flow therethrough, and a cold conduit configured to allow thermal fluid of a second temperature to flow therethrough, the second temperature is lower than the first temperature,
a plurality of heat pump assemblies, each being connected to:
a thermal heating circuit comprising a thermal heating circuit inlet connected to the hot conduit and a thermal heating circuit outlet connected to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet;

each heat pump assembly comprising:
a heat pump; and
a heat pump circuit comprising a heat pump circuit inlet connected to the thermal heating circuit at a first heat pump connection point, a heat pump circuit outlet connected to the thermal heating circuit at a second heat pump connection point and a heat pump control pump configured to control a flow of thermal fluid from the heat pump circuit inlet through the heat pump at a heat extraction side thereof to the heat pump circuit outlet.

The heat pump circuit and the thermal heating circuit partially overlap, the overlap is between the first and second heat pump connection points.

The thermal energy system further comprising a plurality of cooling machine assemblies, each being connected to a:
a thermal cooling circuit comprising a thermal cooling circuit inlet connected to the cold conduit and a thermal cooling circuit outlet connected to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet.

Each cooling machine assembly further comprising:
a cooling machine; and
a cooling machine circuit comprising a cooling machine circuit inlet connected to the thermal cooling circuit at a first cooling machine connection point, a cooling machine circuit outlet connected to the thermal cooling circuit at a second cooling machine connection point and a cooling machine control pump configured to control a flow of thermal fluid from the cooling machine circuit inlet through the cooling machine at an heat generation side thereof to the cooling machine circuit outlet.

The cooling machine circuit and the thermal cooling circuit partially overlap, the overlap is between the first and second cooling machine connection points. The thermal energy system further comprises a central controller according the first aspect. The method comprising:
altering the heating circuit outlet temperature and the cooling circuit outlet temperature,
determining a change between the present total power consumption and a previously determined total power consumption based on power consumption data pertaining to the plurality of heat pump assemblies and the plurality of cooling assemblies, and
increasing or decreasing the heating circuit outlet temperature and the cooling circuit outlet temperature based on the change. The respective outlet temperatures are thus varied until the total power consumption of the thermal energy system is reduced. The thermal energy system can thus meet the thermal loads placed on the system while achieving improved overall efficiency.

In one embodiment, if the change in total power consumption is determined to be a decrease from the previously determined total power consumption, the heating circuit outlet temperature is further decreased if the previous altering of the heating outlet temperature was a decrease and wherein the heating circuit outlet temperature is further increased if the previous altering of the heating circuit outlet temperature was an increase. If the change in total power consumption is determined to be an increase from the previously determined total power consumption, the heating circuit outlet temperature is increased if the previous altering of the heating circuit outlet temperature was a decrease and the heating circuit outlet temperature is decreased if the previous altering of the heating circuit outlet temperature was an increase.

In one embodiment, the method comprises, if the change in total power consumption is determined to be a decrease from the previously determined total power consumption, the cooling circuit outlet temperature is further decreased if the previous altering of the heating outlet temperature was a decrease and the cooling circuit outlet temperature is further increased if the previous altering of the cooling circuit outlet temperature was an increase. If the change in total power consumption is determined to be an increase from the previously determined total power consumption, the cooling circuit outlet temperature is increased if the previous altering of the cooling outlet temperature was a decrease and the heating circuit outlet temperature is decreased if the previous altering of the cooling circuit outlet temperature was an increase.

The heating circuit outlet temperature of each heat pump assembly and the cooling circuit outlet temperature of each cooling machine assembly may further be controlled independently of each other.

In one embodiment, the heating circuit outlet temperature and the cooling circuit outlet temperature are controlled by changing the flow rate of thermal fluid provided by the thermal heating circuit flow controller and the thermal cooling circuit flow rate controller respectively.

In one embodiment, the method is performed on the thermal heating circuit before it is performed on the thermal cooling circuit, or vice versa. The change in the total electric power consumption of the thermal energy system for each variation/altering in outlet temperature, be it in the heating circuit or in the cooling circuit, can thus be more readily determined.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
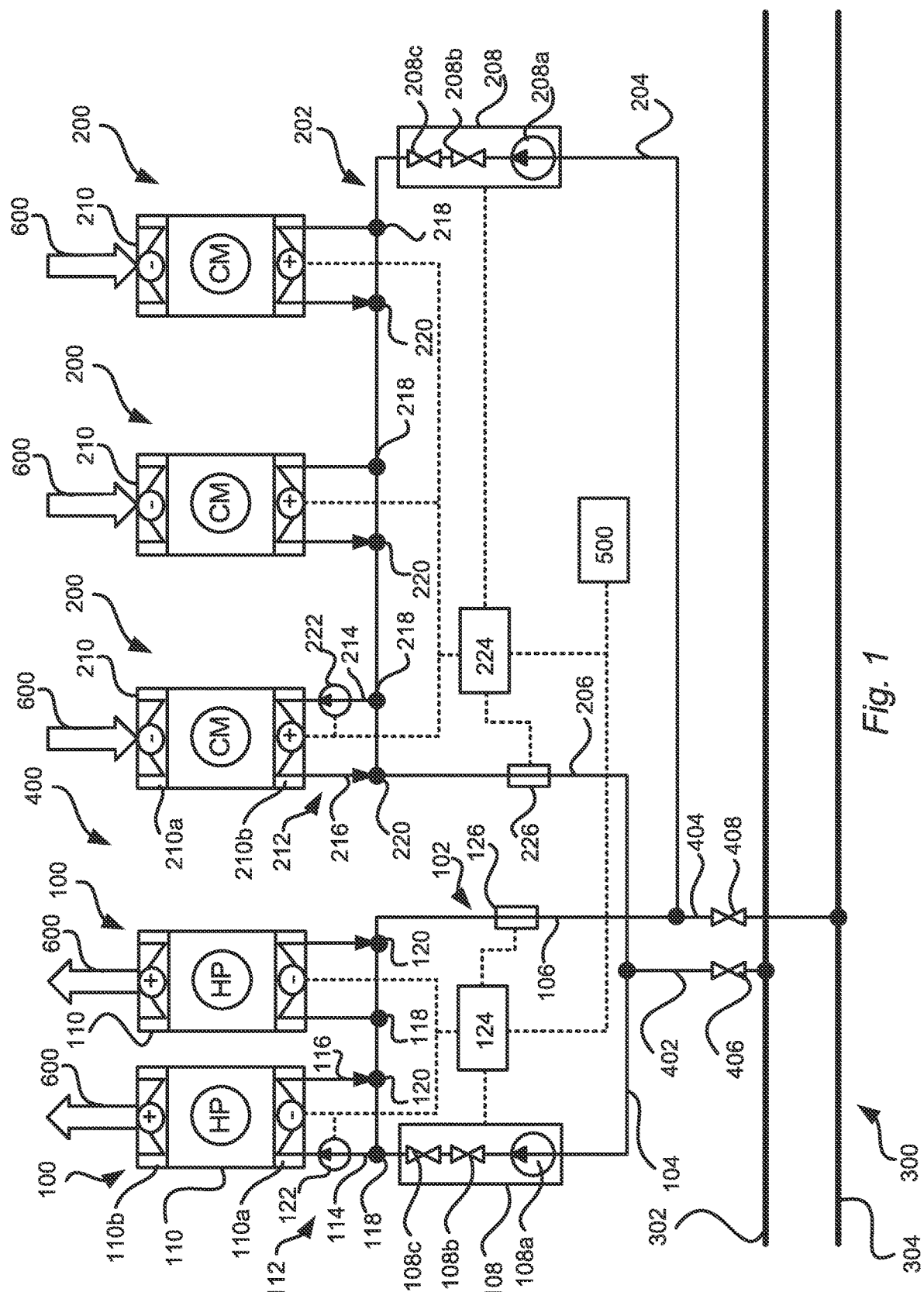
FIG. 1 discloses a schematic drawing of a thermal energy system according to one embodiment.

FIG. 1 schematically illustrates a thermal energy system 400 for distributing heat from a thermal energy circuit 300, to one or several thermal loads 600 such as heating/cooling and/or tap hot water for a building. The building may be any type of building suitable for connection to the thermal energy circuit 300, such as a residential building, commercial or office building, an apartment building, a free-standing house or an industrial building. The thermal energy circuit 300 may be a district heating grid or a district cooling grid known in the art. The district heating grid (or a district cooling grid) may comprise a supply conduit providing heating (or cooling) medium from a thermal plant (not shown) and a return conduit which transport cooled heating medium (or heated cooling medium) to the thermal plant. The heating (or cooling) medium may be any fluid suitable for heating (or cooling) at the thermal plant and transported by means of the supply conduit and the return conduit, such as water. The thermal fluid may further comprise anti-freeze components such as glycol and/or bioethanol, which may allow greater temperature variations of the thermal fluid. The heating (or cooling) medium will henceforth be referred to as "thermal fluid". The thermal plant may be a geothermal plant, an electrically powered plant for heating (or cooling) fluids, wind or solar plants, or may be driven by combustion of fuels, such as gas or oil. The thermal plant is configured to heat (or cool) the thermal fluid and pump it through the thermal energy circuit 300. For a district heating grid, the supply conduit is considered as a hot conduit 302 and the return conduit is considered as a cold conduit 304. For a district cooling grid, the supply conduit is considered as a cold conduit 304 and the return conduit is considered as a hot conduit 302.

As an alternative to being a district heating or district cooling grid, the thermal energy circuit 300 may be a combined district heating and cooling grid as previously disclosed in, e.g., WO 2017/076868 filed by E.ON Sverige AB. In such case, the hot and cold conduits 302 and 304 are not to be seen as supply and return conduits but instead to be seen as the hot conduit and the cold conduit 304 as disclosed in WO 2017/076868.

Hence, the thermal energy circuit 300 comprises a hot conduit 302 and a cold conduit 304 for distributing thermal energy to/between thermal energy systems 400 connected thereto.

The thermal energy system 400 is configured to extract/deposit heat from/to the thermal fluid of thermal energy circuit 300 by means of a plurality of heat pump assemblies 100 and a plurality of cooling machine assemblies 200. Each of the heat pump assemblies 100 and/or of the cooling machine assemblies 200 can serve one building or a plurality of buildings. A specific building may comprise one heat pump assembly 100/one cooling machine assembly 200. A specific building may comprise more than one heat pump assembly 100 and cooling machine 200 respectively.

Each thermal load 600 may be formed in a number of ways, for instance via water-water heating, water-air heating etc. Moreover, in a heat pump assembly 100, a thermal load 600 may be constituted not only by space heating but also e.g. by provision of tap hot water. The cooling machine 200 may be configured to meet thermal loads 600 constituted by comfort cooling, to provide cooling to office equipment such as server rooms etc. and/or for cooling of water just to name a few examples.

Each of the thermal loads 600 may change dynamically which naturally affects the heat pump assemblies 100 and the cooling machine assemblies 200. For instance, the thermal output required from a heat pump assembly 100 or from a cooling machine assembly 200 to maintain a certain preferred indoor temperature of the building 600 may rapidly change with changes in weather. Regardless of the conditions under which the heat pump assemblies 100 and the cooling machine assemblies 200 respectively are subjected to, it is desired that the thermal energy system 400 as a whole operates as efficiently as possible. I.e. that the total electric power consumption thereof is maintained as low as possible for a given operating condition.

The heat pump assemblies 100 and the cooling machine assemblies 200 shown in FIG. 1 are connected to a thermal heating circuit 102 and to a thermal cooling circuit 202 respectively both comprised in the thermal energy system 400. The thermal heating circuit 102 is connected to the thermal energy circuit 300 via a thermal heating circuit inlet 104 connected to the hot conduit 302 and by a thermal heating outlet 106 connected to the cold conduit 304. The thermal heating circuit inlet 104 draws thermal fluid from the hot conduit 302 and the thermal heating circuit outlet 106 returns thermal fluid to the cold conduit 304 having extracted heat therefrom, thus returning thermal fluid having a lower temperature. The thermal cooling circuit 202 is connected to the thermal energy circuit 300 via a thermal cooling circuit inlet 204 connected to the cold conduit 304 and by a thermal cooling outlet 206 connected to the hot conduit 304. The thermal cooling circuit inlet 204 draws thermal fluid from the cold conduit 304 and the thermal cooling circuit outlet 206 returns thermal fluid to the hot conduit 304 having deposited heat therein, thus returning thermal fluid having a higher temperature.

In the embodiment shown in FIG. 1, the thermal heating circuit 102 and the thermal cooling circuit 202 are also connected to each other such that thermal fluid can circulate from the thermal cooling circuit outlet 206 to the thermal heating circuit inlet 104 and from the thermal heating circuit outlet 106 to the thermal cooling circuit inlet 204. I.e. thermal fluid may be circulated directly between the thermal heating circuit 102 and the thermal cooling circuit 202.

The thermal energy system 400 may be connected to the thermal energy circuit 300 by means of a hot connection conduit 402 which connects the hot conduit 302 with the heating circuit inlet 104 and the cooling circuit outlet 206 and by means of a cold connection conduit 404 which connects the cold conduit 304 with the cooling circuit inlet 204 and the heating circuit outlet 106. Further still, the hot connection conduit 402 and the cold connection conduit 404 may be provided with a thermal fluid inlet control valve 406 and with a thermal fluid outlet control valve 408 respectively. The control valves 406, 408 being configured to control the flow and/or pressures of thermal fluid to/from the thermal energy circuit 300.

For establishing and further controlling the flow of thermal fluid through the thermal heating circuit 102 to the plurality of heat pump assemblies 100 is a thermal heating circuit flow controller 108 provided. The thermal heating circuit flow controller 108 preferably comprises a thermal heating circuit circulation pump 108a and may further comprise a first and optionally a second thermal heating circuit control valve 108b, 108c.

What is further shown in FIG. 1 is that each heat pump assembly 100 comprises a heat pump 110. The heat pumps 110 are configured to extract heat from the thermal fluid distributed from the thermal energy circuit 300 by the thermal heating circuit 102. While only two heat pump assemblies 100 are shown in FIG. 1, it is to be understood that also three or more heat pump assemblies 100 could be connected to the thermal heating circuit 102.

Each heat pump 110 may comprise a heat extraction side 110a and a heat releasing side 110b. The heat extraction side 110a is connected to a respective heat pump circuit 112. The heat pump circuit 112 is in turn connected to the thermal heating circuit 102 via a heat pump circuit inlet 114 at a first connection point 118 and via a heat pump circuit outlet 116 at a second connection point 120. Each heat pump circuit 112 and the thermal heating circuit 102 partially overlap, such that the overlap is between the first 118 and second 120 connection points.

Each heat pump circuit 112 further comprises a heat pump control pump 122 configured to control the flow rate of thermal fluid from the heat pump circuit inlet 114 through the heat pump 110 heat extraction side 110a. It is to be realized that while in FIG. 1 only one heat pump assembly 100 is shown being provided with a heat pump control pump 122, each heat pump assembly 100 may be provided with a heat pump control pump 122.

For establishing and controlling the flow of thermal fluid through the thermal cooling circuit 202 is a thermal cooling circuit flow controller 208 provided. The thermal cooling circuit flow controller 208 preferably comprises a thermal cooling circuit circulation pump 208a and it may further comprise a first and optionally a second thermal cooling circuit control valve 208b, 208c.

What is further shown in FIG. 1 is that each cooling machine assembly 200 comprises a cooling machine 210. The cooling machine 210 is configured to deposit heat into the thermal fluid distributed from the thermal energy circuit 300 by the thermal cooling circuit 202. While three cooling machine assemblies 200 are shown in FIG. 1, it is to be understood that two or more cooling machines assemblies 200 may be connected to the thermal cooling circuit 202.

Each cooling machine 210 may comprise a heat extraction side 210a and a heat releasing side 210b. The heat releasing side 210b is connected to a respective cooling machine circuit 212. Each cooling machine circuit 212 is in turn connected to the thermal cooling circuit 202 via a cooling machine circuit inlet 214 at a first connection point 218 and via a cooling machine circuit outlet 216 at a second connection point 220. Each cooling machine circuit 212 and the thermal cooling circuit 202 partially overlap, such that the overlap is between the first 218 and second 220 connection points.

The cooling machine circuit 212 further comprises a cooling machine control pump 222 configured to control the flow rate of thermal fluid from the cooling machine circuit inlet 214 through the cooling machine 210 heat releasing side 210a. It is to be realized that while in FIG. 1 only one cooling machine assembly 200 is shown being provided with a cooling machine control pump 222, each cooling machine assembly 200 may be provided with a cooling machine control pump 222.

A heat pump assembly controller 124 and a cooling machine assembly controller 224 may be provided to control the heat pump assembly 100 and the cooling machine assembly 200 respectively. For instance, the respective controller 124, 224 may be configured to control the respective control pump 122, 222 on each heat pump circuit 112 and on each cooling machine circuit 212. The respective controller 124, 224 may further be connected to each heat pump 110 and to each cooling machine 210 for control thereof and for monitoring the performance thereof such as the power consumption and/or the thermal load 600 thereof. In one embodiment, the heat pump assembly controller 124 and/or the cooling machine assembly controller 224 may be formed as a part or a function of a central controller 500 and/or be separate units connected thereto. Further still, the heat pump assembly controller 124 and/or the cooling machine assembly controller 224 may be connected to the thermal heating circuit flow controller 108 and the thermal cooling circuit flow controller 208 respectively.

In one embodiment, as shown in FIG. 1, a heating circuit outlet temperature sensor 126 and a cooling circuit outlet temperature sensor 226 are provided on the thermal heating circuit outlet 106 and on the thermal cooling circuit outlet 206 respectively. The respective temperature sensor 126, 226 is configured to detect the temperature of the thermal fluid in the conduit 106, 206 to which it is attached. The heating circuit outlet temperature sensor 126 being connected to the heat pump assembly controller 124 and the cooling circuit outlet temperature sensor 226 being connected to the cooling machine assembly controller 224.

Generally, it is desired to achieve as high a coefficient of performance (COP) as possible for each heat pump 110 and for each cooling machine 210. I.e. the relationship between heat extracted/heat deposited and energy, electric power, consumed by the heat pump 110/cooling machine 210 should be as high as possible. However, the efficiency of the entire thermal energy system 400 is determined by more than the COP of each heat pump 110 and/or of each cooling machine 210. Also, the electric power required by all other energy consuming devices of the thermal energy system 400 must be considered. For instance, the heat pump control pump 122, the cooling machine control pump 222, the thermal heating circuit controller 108 and the thermal cooling circuit controller 208 requires power in order to achieve the required flow and thus affects the overall efficiency/COP of the thermal energy system 400. Further still, each heat pump assembly 100 and each cooling machine assembly 200 connected to the thermal energy system 400 affects one another and it is consequently desired to find a way to take improve the overall efficiency of the entire thermal energy system 400.

The provided central controller 500 is thus configured to control the thermal energy system 400, more specifically the thermal heating circuit flow controller 108 and the thermal cooling circuit flow controller 208 in response to the total electric power consumption of the thermal energy system 400. The central controller 500 is configured to alter the temperature of the thermal fluid in the thermal heating circuit outlet 106 and in the thermal cooling circuit outlet 206 respectively, as may be measured by temperature sensors 126, 226. The altering of the temperature in the respective outlet 106, 206 is achieved by controlling the respective heating/cooling circuit flow controller 108, 208 which changes the flow rate of thermal fluid in the heating circuit 102 and in the cooling circuit 202 respectively. A change in the flow rate of thermal fluid in the heating circuit 102 and in the cooling circuit 202 affects the heat pump assemblies 100 and cooling machine assemblies 200 connected thereto. These will adapt to the new flow rate and a change in electrical power consumption of the thermal energy system 400 can then be determined by the central controller 500. The goal of the control of the thermal energy system 400 by the central controller 500 is to reduce total electrical power consumption thereof.

As mentioned, the conditions under which the thermal energy system 400 operates are dynamic. I.e. the thermal loads 600 are constantly subject to change which means that a certain flow rate in the thermal heating circuit 102 and in the thermal cooling circuit 202 does not always result in the same efficiency of the thermal energy system 400 nor in the same respective outlet temperature of the thermal fluid. The central controller 500 thus periodically/continuously iterates the control of the thermal energy system 400 to keep the thermal fluid temperature in the heating circuit outlet 106 and in the cooling circuit outlet 206 respectively such that the electric power consumption of the thermal energy system 400 is optimized/reduced for any operating condition/thermal load 600.

As is shown in FIG. 1, the central controller 500 may be connected, either directly or via the heating pump assembly controller 124 and the assembly controller 224 respectively, to the heating circuit controller 108 and to the cooling circuit controller 208. The central controller 500 may further be connected, either directly or via the heating pump assembly controller 124 and the assembly controller 224 respectively, to each heat pump 110 and to each cooling machine 210. The central controller 500 may furthermore be connected, either directly or via the heating pump assembly controller 124 and the assembly controller 224 respectively, to the heating circuit outlet temperature sensor 126 and to the cooling circuit outlet temperature sensor 226. The central controller 500 may be connected, directly or indirectly, to each component of the thermal energy system 400 that requires. The central controller 500 may thus collect power consumption data indicating a total power consumption of the thermal energy system 400.

Figure 2:
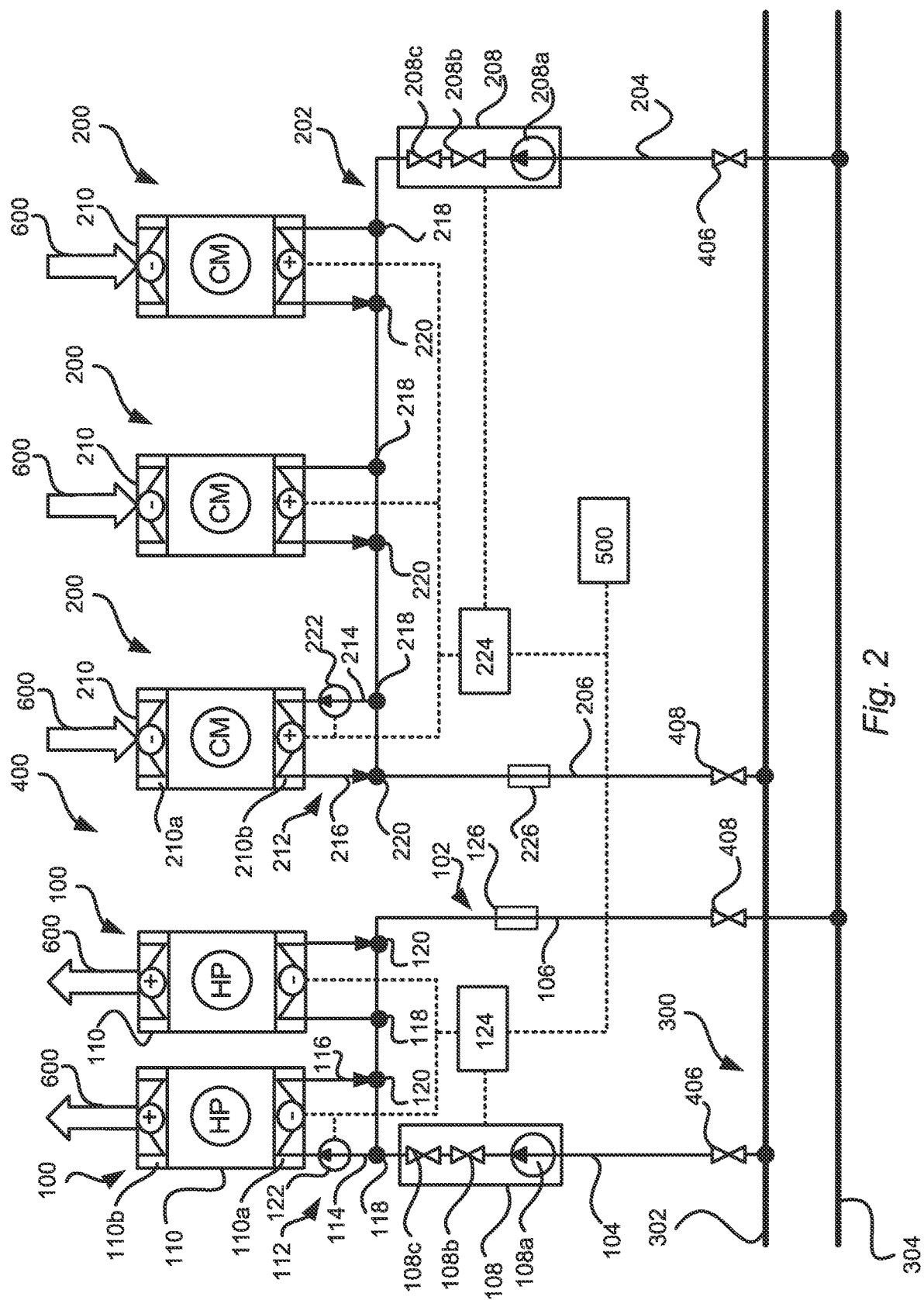
FIG. 2 discloses a schematic drawing of a thermal energy system according to one embodiment.

FIG. 2 shows another embodiment of the thermal energy system 400, in which the thermal heating circuit 108 and the thermal cooling circuit 208 are not connected directly to each other. The embodiment shown in FIG. 2 is in other respects identical to that shown in FIG. 1. The thermal heating circuit inlet 104 connects to the hot conduit 302 of the thermal energy circuit 300 and the thermal heating circuit outlet 106 connects to the cold circuit 302. The thermal cooling circuit inlet 204 connects to the cold conduit 304, while the thermal cooling circuit outlet 106 connects to the hot conduit 302.

Further still, the heating circuit inlet 104 and the cooling circuit inlet 204 may be provided with a thermal fluid inlet control valve 406. The heating circuit outlet 106 and cooling circuit outlet 206 may be provided with a thermal fluid outlet control valve 408. The control valves 406, 408 being configured to control the flow and/or pressures of thermal fluid to/from the thermal energy circuit 300.

In the embodiment shown in FIG. 2, the thermal heating circuit 102 and the thermal cooling circuit 202 can be controlled entirely independently of each other as they are only connected to each other via the thermal energy circuit 300.

Figure 3:
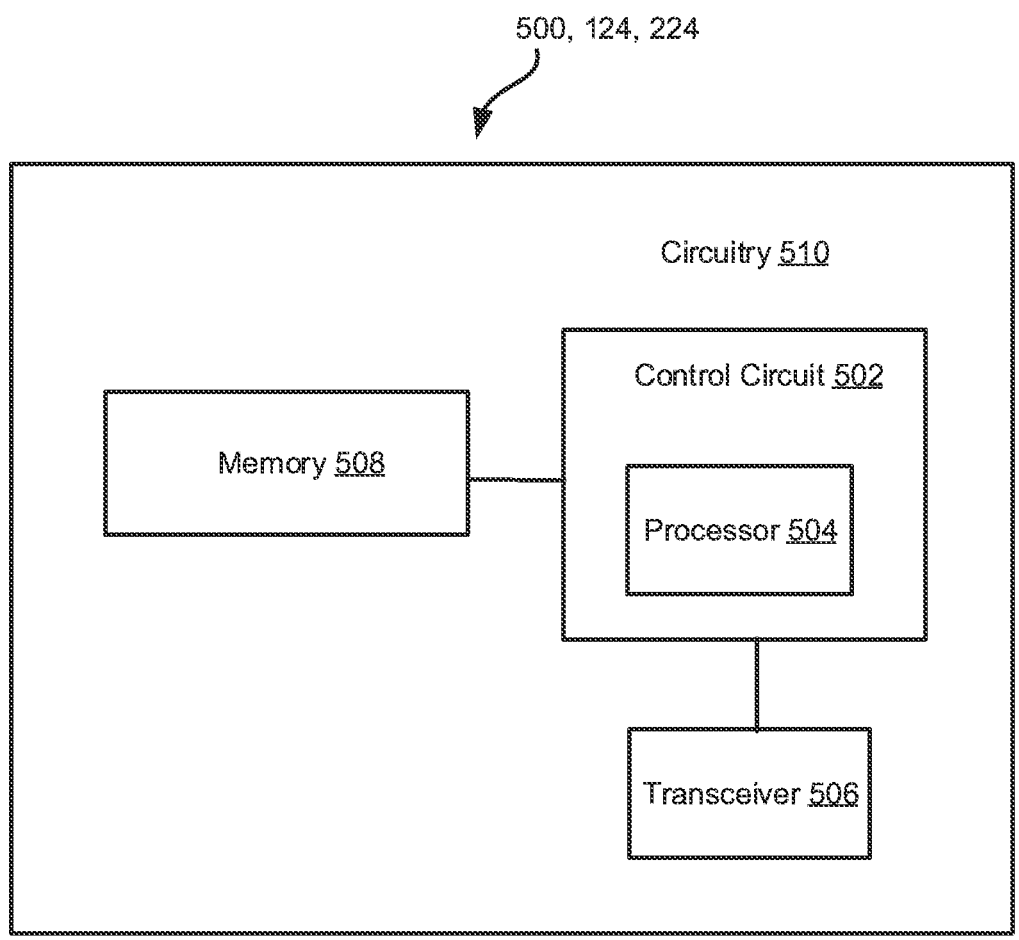
FIG. 3 discloses a schematic outline of a central controller for controlling a thermal energy system according to one embodiment.

In FIG. 3, is a schematic illustration of the central controller 500 shown. The central controller 500 configured to carry out overall control of functions and operations of the thermal energy system 400, and thus comprises a circuitry 510 which may be associated with a memory 508. The circuitry 510 may include a control circuit 502 and an associated processor 504, such as a central processing unit (CPU), microcontroller, or microprocessor. The processor 504 is configured to execute program code stored in the memory 508, in order to carry out functions and operations of the central controller 500.

The memory 508 may be one or more of a buffer, a flash memory, a hard drive, a removable media, a volatile memory, a non-volatile memory, a random access memory (RAM), or another suitable device. In a typical arrangement, the memory 508 may include a non-volatile memory for long term data storage and a volatile memory that functions as system memory for the central controller 500. The memory 508 may exchange data with the control circuit 502 over a data bus. Accompanying control lines and an address bus between the memory 508 and the control circuit 502 also may be present.

The circuitry 510 may further comprise a transceiver 506, connected to the control circuit 502, configured to allow remote control and communication between units of the thermal energy system 400. A unit of an assembly, may be a control pump 122, 222, a valve, a heat pump 110, a cooling machine 210, a flow controller 108, 208, a temperature sensor 126, 226 etc. The communication path over which the communication is made may be wired or wireless. The communication may include data transfers, and the like. Data transfers may include, but are not limited to, downloading and/or uploading data and receiving or sending messages. The data may be processed by the processor 504. The processing may include storing the data in a memory, e.g. the memory 508 of the circuitry 510, executing operations or functions, and so forth. The communication may be individual for each unit of the respective assembly.

Functions and operations of the central controller 500 may be embodied in the form of executable logic routines (e.g., lines of code, software programs, etc.) that are stored on a non-transitory computer readable medium (e.g., the memory 508) of the circuitry 510 and are executed by the control circuit 502 (e.g., using the processor 504). Furthermore, the functions and operations of the central controller 500 may be a stand-alone software application or form a part of a software application that carries out additional tasks related to the central controller 500. The described functions and operations may be considered a method that the corresponding device is configured to carry out. Also, while the described functions and operations may be implemented in software, such functionality may as well be carried out via dedicated hardware or firmware, or some combination of hardware, firmware and/or software. The heat pump controller 124 and the cooling machine controller 224 may be formed in a similar manner as the central controller 500. In one embodiment, the heat pump controller 124 and the cooling machine controller 224 are integral to the central controller 500 and thus comprised, either as physical units or as functions, in said central controller 500 which may then be connected directly to components of each heat pump assembly 100 and of each cooling machine assembly 200.

The central controller 500 is configured for controlling power consumption in a thermal energy system 400 comprising a plurality of heat pump assemblies 100, each heat pump assembly 100 being connected to a thermal energy circuit 300 comprising a hot conduit 302 and a cold conduit 304 via a thermal heating circuit inlet 104 connected to the hot conduit 302 and via a thermal heating circuit outlet 106 connected to the cold conduit 304. The heat pump assembly further comprises a thermal heating circuit flow controller 108 configured to control a flow of thermal fluid from the thermal heating circuit inlet 104 to the thermal heating circuit outlet 106.

The thermal energy system 400 further comprises a plurality of cooling machine assemblies 200, each cooling machine assembly 200 being connected to the thermal energy circuit 300 via a thermal cooling circuit inlet 204 connected to the cold conduit 304 and via a thermal cooling circuit outlet 206 connected to the hot conduit 302 and comprises a thermal cooling circuit flow controller 208 configured to control a flow of thermal fluid from the thermal cooling circuit inlet 204 to the thermal cooling circuit outlet 206.

The central controller transceiver 506 is configured to receive power consumption data pertaining to the plurality of heat pump assemblies 100 and the plurality of cooling assemblies 200. The power consumption data may be formed by a signal from each of, or from components thereof, the heat pump assemblies 100 and the cooling machine assemblies 200 and/or from the heat pump assembly controller 124 and the cooling machine assembly controller 224. It may further be a signal indicating the electrical power consumption of each heat pump 110, each cooling machine 210, each heat pump control pump 122, each cooling machine control pump 222, each heating circuit flow controller 108 and of each cooling circuit flow controller 208. It may comprise the total electric power consumption the thermal energy system 400.

The central controller 500 is configured to transmit a heating circuit control signal to the thermal heating circuit flow controller 108, the heating circuit control signal being indicative of a heating circuit outlet temperature in the thermal heating circuit outlet 106. The central controller 500 further being configured to transmit a cooling circuit control signal to the thermal cooling circuit flow controller 208, the control signal being indicative of a cooling circuit outlet temperature in the thermal cooling circuit outlet 206.

The central controller circuitry 510 is configured to execute an outlet temperature setting function configured to periodically alter the heating circuit outlet temperature and the cooling circuit outlet temperature. The respective thermal fluid outlet temperatures are altered by controlling the thermal heating circuit flow controller 108 and the thermal cooling circuit flow controller 208, thus altering the flow rate of thermal fluid in the thermal heating circuit 102 and in the thermal cooling circuit 202 respectively. A decrease in the flow rate of thermal fluid in the thermal heating circuit 102 will cause a decrease in the temperature of the thermal fluid in the heating circuit outlet 106 and vice versa. A decrease in the flow rate of thermal fluid in the thermal cooling circuit 202 will cause an increase in the temperature of the thermal fluid in the cooling circuit outlet 206 and vice versa. The central controller 500 may receive feedback from the respective outlet temperature sensor 126, 226 for achieving the desired temperature of the thermal fluid in the thermal heating circuit outlet 106 and in the thermal cooling circuit outlet 206 respectively.

The central controller 500 further comprises an analyzing function, implemented and executed by the circuitry 502, configured to, based on the power consumption data, determine a present total power consumption of the plurality of heat pump assemblies 100 and the plurality of cooling machine assemblies 200. The outlet temperature setting function is further configured to increase or decrease the heating circuit outlet temperature and the cooling circuit outlet temperature based on a change between a previously determined total power consumption and the determined present total power consumption.

In one embodiment, temperature setting function is configured to set the heating circuit outlet temperature and the cooling circuit outlet temperature to a fixed value for a predetermined period of time. The thermal energy system 400 will thus have time to stabilize, with each heat pump assembly 100 and each cooling machine assembly 200, finding a new equilibrium or balance in which each heat pump control pump 122, each cooling machine control pump 222, each heat pump 110 and each cooling machine 210 adapts to the new flow rate of thermal fluid in the thermal heating circuit 102 and in the thermal cooling circuit 202 respectively.

When the thermal energy system 400 has adapted to the new conditions can the new total electrical power consumption be determined more accurately. The period of time which each temperature is set for may be determined by a set time period such as 30 to 120 seconds. It may also be determined by when the total electrical power consumption stabilizes after a change in the temperature of the thermal fluid in either of the thermal heating circuit outlet 106 or in the thermal cooling circuit outlet 206. The temperature in the thermal heating circuit outlet 106 may, as mentioned, be measured by means of the heating circuit outlet temperature sensor 126 and the temperature in the thermal cooling circuit outlet 206 may, as mentioned, be measured by means of the cooling circuit outlet temperature sensor 226.

In one embodiment, the heating circuit outlet temperature is configured to be set to between −8° C. and 50° C. and the cooling circuit outlet temperature is configured to be set to between −4° C. and 60° C.

Figure 4:
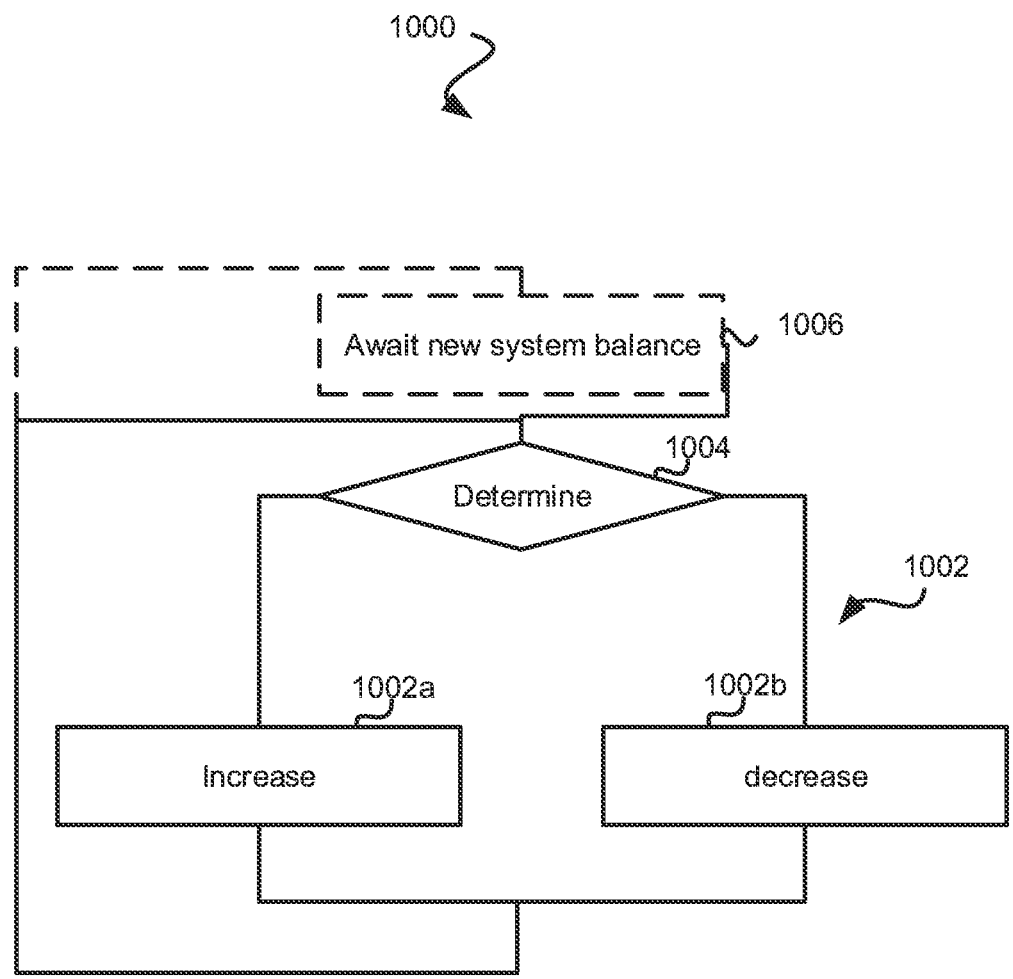
FIG. 4 discloses a flow chart of a method for controlling a thermal energy system comprising a central controller according to one embodiment.

Turning to FIG. 4 in which a schematic flowchart of a method 1000 for controlling the power consumption of a thermal energy system 400 is shown. The method comprises altering 1002 the heating circuit outlet temperature and the cooling circuit outlet temperature. Typically, the method 1000 is initiated either by an alteration 1002 of the temperature of the thermal fluid in the thermal heating circuit outlet 106 and/or in the thermal cooling circuit outlet 206, or by determining 1004 a present power consumption of the thermal energy system 400 followed by an alteration 1002 of the outlet temperature. Thereafter can a change between the present total power consumption and a previously determined total power consumption of the thermal energy system 400 be determined 1004. In one embodiment the method 1000 comprises awaiting 1006 a new thermal energy system 400 balance before the present total power consumption is determined 1004, as is described above.

The time period that is required before a present total power consumption is determined 1004 can be defined by a set, predetermined, time period, preferably between 30 and 120 seconds. It may also be determined by when the total power consumption of the thermal energy system 400 stabilizes after that the new outlet temperature has been set, whereby the present total power consumption can be determined 1004 as the stabilized total power consumption. A stabilized electrical power consumption can be defined as an electrical power consumption that has reached a sufficiently low degree of change per time unit in electrical power consumption after an altered outlet temperature.

Based on the determined change in electrical power consumption in the thermal energy system 400, the temperature in the thermal heating circuit outlet 106 and/or in the thermal cooling circuit outlet 206 is then increased 1002a or decreased 1002b.

The method 1000 may further comprise that, if the change in total electric power consumption is determined 1004 to be a decrease from the previously determined total power consumption, the heating circuit outlet temperature is further decreased 1002b if the previous altering 1002 of the heating outlet temperature was a decrease. The heating circuit outlet temperature may then also be further increased 1002a if the previous altering of the heating circuit outlet temperature was an increase which achieved a decrease in total power consumption of the thermal energy system 400.

If the change in total power consumption is determined 1004 to be an increase from the previously determined total power consumption, the heating circuit outlet temperature may be increased 1002a if the previous altering 1002 of the heating circuit outlet temperature was a decrease and the heating circuit outlet temperature may be decreased 1002b if the previous altering 1002 of the heating circuit outlet temperature was an increase.

Furthermore, if the change in total power consumption is determined 1004 to be a decrease from the previously determined total power consumption, the cooling circuit outlet temperature is further decreased 1002b if the previous altering 1002 of the heating outlet temperature was a decrease. The cooling circuit outlet temperature may be further increased 1002a if the previous altering of the cooling circuit outlet temperature was an increase.

If the change in total power consumption is determined 1004 to be an increase from the previously determined total power consumption, may the cooling circuit outlet temperature be increased 1002a if the previous altering 1002 of the cooling outlet temperature was a decrease. Finally, the heating circuit outlet temperature may be decreased 1002a if the previous altering 1002 of the cooling circuit outlet temperature was an increase.

The method shown in FIG. 4 may be performed for the heating circuit 102 and the cooling circuit 202 independently, i.e. controlling the temperature of the thermal fluid in the heating circuit outlet 106 and in the cooling circuit outlet 206 at the same time and/or independently of each other to achieve a reduced total electric power consumption of the thermal energy system 400.

As mentioned above, the heating circuit outlet temperature and the cooling circuit outlet temperature are controlled by changing the flow rate of thermal fluid provided by the thermal heating circuit flow controller 108 and the thermal cooling circuit flow rate controller 208 respectively. The heating circuit outlet temperature sensor 126 and the cooling circuit outlet temperature sensor 226 may respectively provide temperature information to the central controller 500 to allow feedback control of the thermal heating circuit flow controller 108 and of the thermal cooling circuit flow controller 208 to achieve the desired outlet temperatures. The method 1000 may further comprise determining 1004 that, when an outlet temperature is achieved where both an increase and a decrease in thermal fluid temperature in the thermal heating circuit outlet 106 does not achieve a sufficiently large reduction in total electric power consumption of the thermal energy system 400, to proceed and alter the temperature in the thermal cooling circuit outlet 206 instead. The method 1000 is then performed altering the thermal fluid temperature in the thermal cooling circuit outlet 206 until an outlet temperature is achieved, where an increase and a decrease in thermal fluid temperature in the thermal cooling circuit outlet 206 does not achieve a sufficiently large reduction in total electric power consumption for the thermal energy system 400, after which the method 1000 can be repeated.

Figure 5:
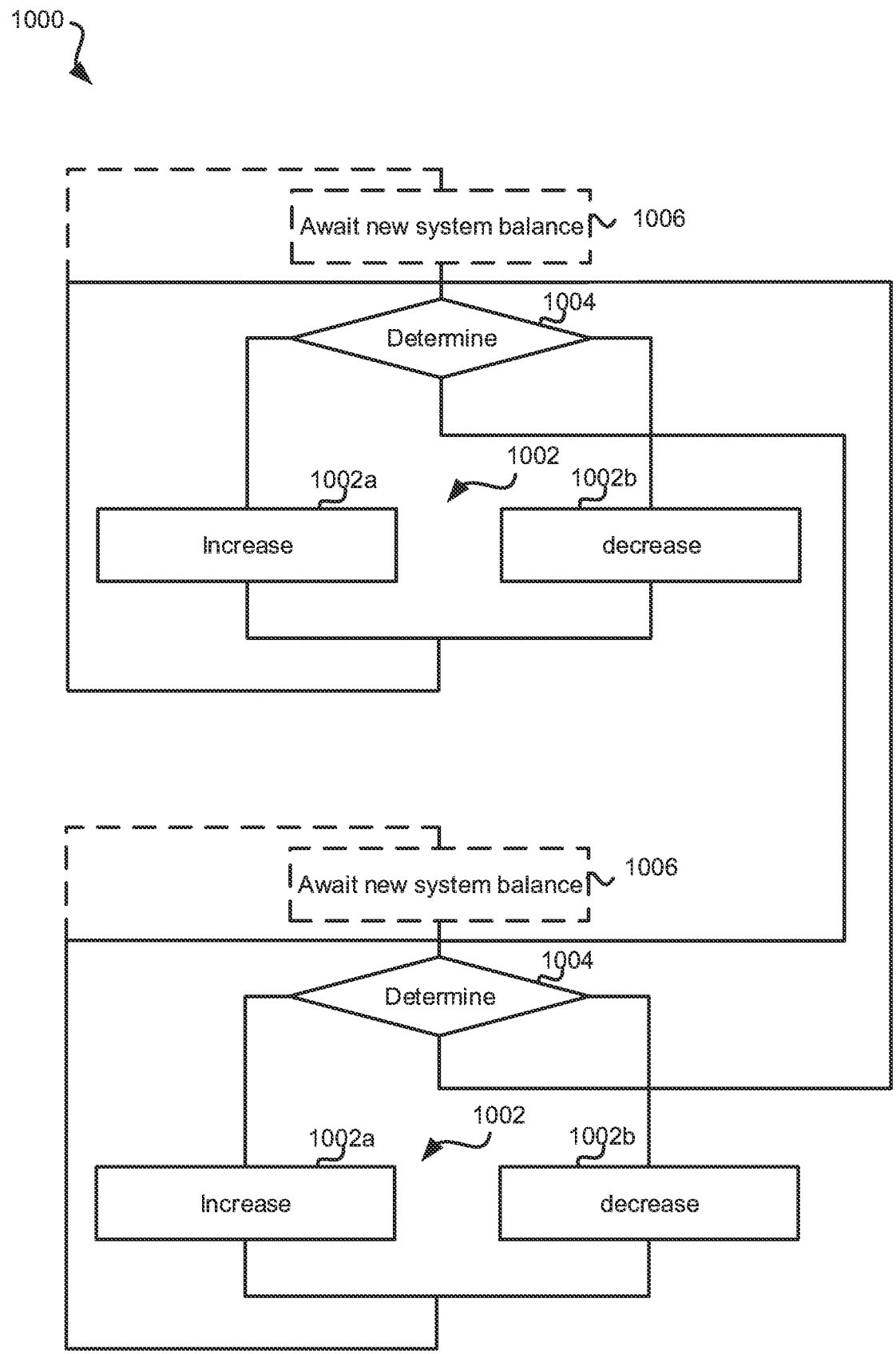
FIG. 5 a flow chart of a method for controlling a thermal energy system comprising a central controller according to one embodiment.

In FIG. 5 is yet another embodiment of the method 1000 for controlling the power consumption of a thermal energy system 400 shown. The method illustrated in FIG. 5 shows how the method 1000 may firstly be performed for the thermal heating circuit 102 such that a thermal fluid temperature in the thermal heating circuit outlet 106 is found which provides a desired reduced total electric power consumption for the thermal heating circuit 102 and all heat pump assemblies 100. The method 1000 subsequently proceeds to iterate the method 1000 on the thermal cooling circuit 202, thus achieving a temperature of the thermal fluid in the thermal cooling circuit outlet 206 which achieves a desired reduced total electric power consumption for the thermal cooling circuit 102 and all cooling machine assemblies 200.

The method 1000 may then be performed again for the thermal heating circuit 102 etc.

It will be appreciated that the present invention is not limited to the embodiments shown. Several modifications and variations are thus conceivable within the scope of the invention which thus is exclusively defined by the appended claims.

The invention claimed is:

1. A central controller for controlling power consumption in a thermal energy system comprising a plurality of heat pump assemblies, each heat pump assembly being connected to a thermal energy circuit comprising a hot conduit and a cold conduit via a thermal heating circuit inlet connected to the hot conduit and via a thermal heating circuit outlet connected to the cold conduit, the thermal energy system further comprising a thermal heating circuit flow controller configured to control a flow of thermal fluid from the thermal heating circuit inlet to the thermal heating circuit outlet, and a plurality of cooling machine assemblies, each cooling machine assembly being connected to the thermal energy circuit via a thermal cooling circuit inlet connected to the cold conduit and via a thermal cooling circuit outlet connected to the hot conduit, the thermal energy system further comprising a thermal cooling circuit flow controller configured to control a flow of thermal fluid from the thermal cooling circuit inlet to the thermal cooling circuit outlet, the central controller comprising:
a transceiver configured to:
receive power consumption data pertaining to the plurality of heat pump assemblies and the plurality of cooling assemblies,
transmit a heating circuit control signal to the thermal heating circuit flow controllers, the heating circuit control signal being indicative of a heating circuit outlet temperature in each thermal heating circuit outlet,
transmit a cooling circuit control signal to the thermal cooling circuit flow controllers, the control signal being indicative of a cooling circuit outlet temperature in each thermal cooling circuit outlet; and
circuitry configured to execute:
an outlet temperature setting function configured to alter the heating circuit outlet temperature and the cooling circuit outlet temperature,
an analyzing function configured to, based on the power consumption data, determine a present total power consumption of the plurality of heat pump assemblies and the plurality of cooling machine assemblies,
the outlet temperature setting function being further configured to increase or decrease the heating circuit outlet temperature and the cooling circuit outlet temperature based on a change between a previously determined total power consumption and the determined present total power consumption.

2. The central controller according to claim 1, wherein the outlet temperature setting function is configured to set the heating circuit outlet temperature and the cooling circuit outlet temperature to a fixed value for a predetermined period of time.

3. The central controller according to claim 1, wherein the heating circuit outlet temperature is configured to be set to between −8° C. and 50° C. and the cooling circuit outlet temperature is configured to be set to between −4° C. and 60° C.

4. A thermal energy system comprising:
a thermal energy circuit comprising a hot conduit configured to allow thermal fluid of a first temperature to flow therethrough, and a cold conduit configured to allow thermal fluid of a second temperature to flow therethrough, the second temperature is lower than the first temperature,
a plurality of heat pump assemblies, each being connected to a thermal heating circuit comprising a thermal heating circuit inlet connected to the hot conduit and a thermal heating circuit outlet connected to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet;
each heat pump assembly comprising:
a heat pump; and
a heat pump circuit comprising a heat pump circuit inlet connected to the thermal heating circuit at a first heat pump connection point, a heat pump circuit outlet connected to the thermal heating circuit at a second heat pump connection point and a heat pump control pump configured to control a flow of thermal fluid from the heat pump circuit inlet through the heat pump at a heat extraction side thereof to the heat pump circuit outlet;
wherein the heat pump circuit and the thermal heating circuit partially overlap, wherein the overlap is between the first and second heat pump connection points;
a plurality of cooling machine assemblies, each being connected to a thermal cooling circuit comprising a thermal cooling circuit inlet connected to the cold conduit and a thermal cooling circuit outlet connected to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet;
each cooling machine assembly comprising:

a cooling machine; and
a cooling machine circuit comprising a cooling machine circuit inlet connected to the thermal cooling circuit at a first cooling machine connection point, a cooling machine circuit outlet connected to the thermal cooling circuit at a second cooling machine connection point and a cooling machine control pump configured to control a flow of thermal fluid from the cooling machine circuit inlet through the cooling machine at an heat generation side thereof to the cooling machine circuit outlet,
wherein the cooling machine circuit and the thermal cooling circuit partially overlap, wherein the overlap is between the first and second cooling machine connection points,
wherein the thermal energy system further comprises a central controller according to claim 1 configured to control the thermal energy system.

5. A method for controlling the power consumption of a thermal energy system, the thermal energy system comprising a hot conduit configured to allow thermal fluid of a first temperature to flow therethrough, and a cold conduit configured to allow thermal fluid of a second temperature to flow therethrough, the second temperature is lower than the first temperature,
a plurality of heat pump assemblies, each being connected to:
a thermal heating circuit comprising a thermal heating circuit inlet connected to the hot conduit and a thermal heating circuit outlet connected to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet;
each heat pump assembly comprising:
a heat pump; and
a heat pump circuit comprising a heat pump circuit inlet connected to the thermal heating circuit at a first heat pump connection point a heat pump circuit outlet connected to the thermal heating circuit at a second heat pump connection point and a heat pump control pump configured to control a flow of thermal fluid from the heat pump circuit inlet through the heat pump at a heat extraction side thereof to the heat pump circuit outlet;
wherein the heat pump circuit and the thermal heating circuit partially overlap, wherein the overlap is between the first and second heat pump connection points;
a plurality of cooling machine assemblies, each being connected to:
a thermal cooling circuit comprising a thermal cooling circuit inlet connected to the cold conduit and a thermal cooling circuit outlet connected to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet;
each cooling machine assembly comprising:
a cooling machine; and
a cooling machine circuit comprising a cooling machine circuit inlet connected to the thermal cooling circuit at a first cooling machine connection point, a cooling machine circuit outlet connected to the thermal cooling circuit at a second cooling machine connection point and a cooling machine control pump configured to control a flow of thermal fluid from the cooling machine circuit inlet through the cooling machine at an heat generation side thereof to the cooling machine circuit outlet,
wherein the cooling machine circuit and the thermal cooling circuit partially overlap, wherein the overlap is between the first and second cooling machine connection points, wherein the thermal energy system further comprises a central controller according to claim 1, the method comprising:
altering the heating circuit outlet temperature and the cooling circuit outlet temperature,
determining a change between the present total power consumption and a previously determined total power consumption based on power consumption data pertaining to the plurality of heat pump assemblies and the plurality of cooling assemblies, and
increasing or decreasing the heating circuit outlet temperature and the cooling circuit outlet temperature based on the change.

6. The method according to claim 5, wherein if the change in total power consumption is determined to be a decrease from the previously determined total power consumption, the heating circuit outlet temperature is further decreased if the previous altering of the heating outlet temperature was a decrease and wherein the heating circuit outlet temperature is further increased if the previous altering of the heating circuit outlet temperature was an increase, and wherein if the change in total power consumption is determined to be an increase from the previously determined total power consumption, the heating circuit outlet temperature is increased if the previous altering of the heating circuit outlet temperature was a decrease and wherein the heating circuit outlet temperature is decreased if the previous altering of the heating circuit outlet temperature was an increase.

7. The method according to claim 5, wherein if the change in total power consumption is determined to be a decrease from the previously determined total power consumption, the cooling circuit outlet temperature is further decreased if the previous altering of the heating outlet temperature was a decrease and wherein the cooling circuit outlet temperature is further increased if the previous altering of the cooling circuit outlet temperature was an increase, and wherein if the change in total power consumption is determined to be an increase from the previously determined total power consumption, the cooling circuit outlet temperature is increased if the previous altering of the cooling outlet temperature was a decrease and wherein the heating circuit outlet temperature is decreased if the previous altering of the cooling circuit outlet temperature was an increase.

8. The method according to claim 5, wherein the heating circuit outlet temperature of each heat pump assembly and the cooling circuit outlet temperature of each cooling machine assembly are controlled independently of each other.

9. The method according to claim 5, wherein the heating circuit outlet temperature and the cooling circuit outlet temperature are controlled by changing the flow rate of thermal fluid provided by the thermal heating circuit flow controller and the thermal cooling circuit flow controller respectively.

10. The method according to claim 5, wherein the method is performed on the thermal heating circuit before it is performed on the thermal cooling circuit or vice versa.

\* \* \* \* \*